United States Patent
Huang et al.

(10) Patent No.: US 8,432,709 B2
(45) Date of Patent: Apr. 30, 2013

(54) DC-TO-AC POWER INVERTING APPARATUS FOR PHOTOVOLTAIC MODULES

(75) Inventors: Yung-Fu Huang, Miaoli County (TW); Yoshihiro Konishi, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 225 days.

(21) Appl. No.: 12/970,579

(22) Filed: Dec. 16, 2010

(65) Prior Publication Data
US 2012/0087157 A1    Apr. 12, 2012

(30) Foreign Application Priority Data
Oct. 8, 2010  (TW) .............................. 99134293 A

(51) Int. Cl.
*H02M 3/335*    (2006.01)
*H02M 7/5387*    (2007.01)

(52) U.S. Cl.
USPC ........................................... 363/17; 363/132

(58) Field of Classification Search ........... 363/17, 363/56.02, 58, 98, 132, 15, 34, 37, 40, 44, 363/52, 55, 108, 109
See application file for complete search history.

(56) References Cited

U.S. PATENT DOCUMENTS

| | | | |
|---|---|---|---|
| 4,445,049 A | 4/1984 | Steigerwald | |
| 4,626,983 A | 12/1986 | Harada et al. | |
| 4,641,232 A | 2/1987 | Pitel | |
| 5,625,539 A | 4/1997 | Nakata et al. | |
| 6,370,050 B1 | 4/2002 | Peng et al. | |
| 6,519,168 B2 * | 2/2003 | Jain et al. | 363/98 |
| 6,807,072 B2 | 10/2004 | Tanabe et al. | |
| 7,072,194 B2 | 7/2006 | Nayar et al. | |
| 7,102,251 B2 | 9/2006 | West | |
| 7,339,287 B2 | 3/2008 | Jepsen et al. | |
| 7,372,709 B2 | 5/2008 | Mazumder et al. | |
| 8,059,434 B2 * | 11/2011 | Huang et al. | 363/98 |
| 2004/0027112 A1 | 2/2004 | Kondo et al. | |

(Continued)

OTHER PUBLICATIONS

Y.Konishi and Y. Huang, "High-frequency link single-phase grid-connected inverter using LCL resonant tank for photovoltaic AC module", 2008,Industrial electronics 2008.IECON 2008. 34th annual conference of IEEE, pp. 2184-2188.*

(Continued)

*Primary Examiner* — Jessica Han
*Assistant Examiner* — Carlos Rivera-Perez
(74) *Attorney, Agent, or Firm* — WPAT, PC; Justin King

(57) ABSTRACT

The disclosure provides a DC-to-AC power inverting apparatus for photovoltaic modules, which comprises two stages: a first stage including a resonant circuit in series, an isolating transformer with three windings, a full-bridge DC-to-AC converting unit operating in a high-frequency switch mode so as to reduce the transformer volume, and a full-wave rectifier; while a second stage including a half-bridge single-phase inverter unit with two active switches. In the first stage, any high-frequency AC signal produced from the primary winding of the isolating transformer is converter into a DC signal by the full-wave rectifier at the secondary winding of the isolation transformer. Moreover, the switching of the two active switches in the second stage is controlled to operate in a low-frequency mode using a switching frequency synchronized with the frequency of the public electrical supply to control the AC output, and thus to reduce the switching loss of the active switches.

5 Claims, 11 Drawing Sheets

U.S. PATENT DOCUMENTS

| | | |
|---|---|---|
| 2004/0027842 A1 | 2/2004 | Tanabe et al. |
| 2004/0223351 A1 | 11/2004 | Kurokami et al. |
| 2009/0086514 A1 | 4/2009 | Fornage et al. |
| 2009/0086520 A1 | 4/2009 | Nishimura |

OTHER PUBLICATIONS

E. Zhang, "Inverter design shines in photovoltaic systems", Jul. 2008, Power electronics technology, pp. 20-25.*

Martina Calais' Johanna Myrzik2 Ted Spoone? Vassilios G. Agelidis4 School of Engineering, Murdoch University, Murdoch WA 6150, Australia Technical University of Eindhoven, The Netherlands School of Electrical Engineering and Telecommunications, University of New South Wales, Australia * Inter-University Centre for Economic Renewable Power Delivery (CERDP), University of Glasgow, U.K. "Inverters for single-phase grid connected photovoltaic systems—An overview" 2002.

Soeren Baekhoej Kjaer, Member, IEEE, John K. Pedersen, Senior Member, IEEE, and Frede Blaabjerg, Fellow, IEEE "A review of single-phase grid-connected inverters for photovoltaic modules" 2005.

Martina Calais' Johanna Myrzik2 Ted Spoone? Vassilios G. Agelidis4 School of Engineering, Murdoch University, Murdoch WA 6150, Australia Technical University of Eindhoven, The Netherlands School of Electrical Engineering and Telecommunications, University of New South Wales, Australia * Inter-University Centre for Economic Renewable Power Delivery (CERPD), University of Glasgow, U.K. "Inverters for single-phase grid connected photovoltaic systems—An overview" 2002.

Dr. Mike Meinhardt and Gunter Cramer SMA Regelsysteme GmbH, 34266 Niestetal, Germany "Past, present and future of grid connected photovoltaic-and hybrid-power-systems", 2000.

Toshihisa Shimizu, Senior Member, IEEE, Keiji Wada, Member, IEEE, and Naoki Nakamura, "Flyback-type single-phase utility interactive inverter with powerpulsation decoupling on the DC input for an AC photovoltaic module system", Sep. 2004.

Frede Blaabjerg, Fellow, IEEE, Zhe Chen, Senior Member, IEEE, and Soeren Baekhoej Kjaer, Member, IEEE "Power electronic as efficient interface in dispersed power generation systems", Sep. 2004.

Tatsuyuki Setaka, Toshio Matsushima, and Seiichi Muroyama NTT Power and Building Facilities Inc. "Photovoltaic system in telecommunications building using AC modules", 2000.

Toshihisa Shimizu, Member, IEEE, Masaki Hirakata, Tomoya Kamezawa, and Hisao Watanabe "Generation control circuit for photovoltaic modules" May 2001.

Hisaichi Irie, Member & Shoshi Takashita, Student Member (Osaka Electro-Communication University) Humiya Kimura, Member & Masaki Eguchi, Member & Kozo Hiyoshi, Member (SHARP corporation) "Utility interactive inverter using immittance converter", 2000.

Satoshi Yatsuki, Keiji Wada, Toshihisa Shimizu, Department of Electrical Engineering, Tokyo Metropolitan University Hiroyuki Takagi, Michio Ito, Kandenko Corporation "A novel AC photovoltaic module system based on the impedance-admittance conversion theory", 2001.

G. S. N. Raju Radar 'B', L.R.D.E. C.V. Raman Nagar Bangalore—560 093 India S . R. Doradla Senior Member, IEEE Dept. of Electrical Engineering India—208 016 "A novel LCL resonant converter with PWM control-analysis , Simulation , and implementation", 1994.

* cited by examiner

US 8,432,709 B2

DC-TO-AC POWER INVERTING APPARATUS FOR PHOTOVOLTAIC MODULES

TECHNICAL FIELD

The present disclosure relates to a DC-to-AC power inverter, and more particularly, to a DC-to-AC power inverting apparatus for photovoltaic modules.

TECHNICAL BACKGROUND

Most circuit structures of the traditional converters for a solar power generation or photovoltaic system are configured in single or two stages of circuit to connect with the public electrical supplies in parallel. The power regulators of household photovoltaic systems are generally built by assembling photovoltaic modules in parallel and/or in series to provide high DC-voltage power. If one of the photovoltaic modules, however, does not work, the output power and performance of the overall system may then decline considerably. Therefore, the integration of a DC-to-AC power inverter with a single photovoltaic module has been developed recently. Through the DC-to-AC power inverter, low-voltage DC power of a photovoltaic module can be converted into AC power to be connected with the public electrical supplies in parallel, with higher operational efficiency and systematic reliability. Moreover, due to the resultant power of low capacity, the distribution system can be constructed with cost advantages of low-capacity specification and low loss of transmission.

Conventional inverters are configured in the two-stage switching mode, in which the switching frequencies are usually about tens of KHz; this leads to a larger volume of the transformer or the inductor in the resonant circuit. Meanwhile, more than two current sensing devices are necessary in the two-stage mode to respectively control the AC output power and the DC input power. It is in need of a control strategy for the switching mode to achieve a DC-to-AC power inverter of competency for photovoltaic modules.

TECHNICAL SUMMARY

To alleviate the drawbacks of the foregoing prior arts, a DC-to-AC power inverting apparatus for photovoltaic modules is provided in this disclosure. The main object of the disclosure is to avoid the need of a low-frequency transformer to operate the AC output of a full-bridge inverter for a solar or photovoltaic module in parallel with the public electrical supply, which may cause a drawback of large volume. Also in this present disclosure, a DC-to-AC power inverting apparatus for photovoltaic modules is provided to decrease the volume of the transformer due to the new circuit configuration and controlling means. The full-wave rectification at the secondary winding of the transformer to rectify AC power to DC power, and the low-frequency switching operation of the inverter unit can lower the switching loss in the switches and hence improve the conversion efficiency of the DC-to-AC power inverting apparatus.

According to one aspect of the present disclosure, a first embodiment provides a DC-to-AC power inverting apparatus for photovoltaic modules, the power inverting apparatus including: a DC-to-AC converting unit composed of a full-bridge inverter, which comprises a first, a second, a third, and a fourth active switches, the first and second active switches connected at a first connection point, and the third and fourth active switches connected at a second connection point; a resonating unit comprising a first inductor and a first capacitor which are connected in series, the resonating unit connected to the first connection point; an isolating transformer comprising a first, a second, and a third windings, the two terminals of the first winding connected respectively to the resonating unit and the second connection point, and the second and third windings connected at a third connection point; a full-wave rectifying unit comprising a first, a second, a third, and a fourth passive switches, the first and second passive switches connected at a fourth connection point, the third and fourth passive switches connected at a fifth connection point, the first and third passive switches connected at a sixth connection point, the second and fourth passive switches connected at a seventh connection point, the fourth connection point connected to the second winding, and the fifth connection point connected to the third winding; and an inverter unit comprising a fifth and a sixth active switches and a second capacitor, the fifth and sixth active switches connected at an eighth connection point, the sixth connection point connected to the fifth active switch, the seventh connection point connected to the sixth active switch, and the third and eighth connection points connected respectively to the second capacitor.

According to another aspect of the present disclosure, a second embodiment provides a DC-to-AC power inverting apparatus for photovoltaic modules, the power inverting apparatus including: a DC-to-AC converting unit composed of a half-bridge inverter, which comprises a first, a second, and a third active switches, and a first and a second capacitors, the first, second, and third active switches connected at a first connection point, the first and second capacitors and the third active switch connected at a second connection point; a resonating unit comprising a first inductor and a third capacitor which are connected in series, the resonating unit connected to the first connection point; an isolating transformer comprising a first, a second, and a third windings, the two terminals of the first winding connected respectively to the resonating unit and the second connection point, and the second and third windings connected at a third connection point; a full-wave rectifying unit comprising a first, a second, a third, and a fourth passive switches, the first and second passive switches connected at a fourth connection point, the third and fourth passive switches connected at a fifth connection point, the first and third passive switches connected at a sixth connection point, the second and fourth passive switches connected at a seventh connection point, the fourth connection point connected to the second winding, and the fifth connection point connected to the third winding; and an inverter unit comprising a fourth and a fifth active switches and a fourth capacitor, the fourth and fifth active switches connected at an eighth connection point, the sixth connection point connected to the fourth active switch, the seventh connection point connected to the fifth active switch, and the third and eighth connection points connected respectively to the second capacitor.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For further understanding and recognizing the fulfilled functions and structural characteristics of the disclosure, several exemplary embodiments cooperating with detailed description are presented as the following.

In this present disclosure, a DC-to-AC power inverting apparatus is provided to combine with the photovoltaic or solar modules, so that an AC power of 100 to 200 Watts can be generated by each of the photovoltaic modules. Regarding a power generation system of solar photovoltaics, a power module of 100 to 200 Watts is preferable due to its low DC voltage and hence easy to be setup. Meantime, its small-scale capacitance and ease of modulization lead to advantages in the production cost, propagation loss of electricity, and conversion efficiency of photovoltaics.

The DC-to-AC power inverting apparatus have a circuit structure with two stages. The first stage includes a full-bridge inverter of high-frequency switching, a resonant circuit in series, an isolating transformer with three windings, and a full-wave rectifier, while the second stage includes a half-bridge single-phase inverter composed of two sets of active switches. The volume of the isolating transformer may be reduced due to high-frequency switching of the full-bridge inverter in the first stage. Also, the high-frequency AC power across the primary winding of the isolating transformer is turned into a DC power by the full-wave rectifier in the first stage. The half-bridge inverter of two-set active switches in the second stage adopts a low-frequency switching means to synchronize with the public electrical supplies, whereby the AC output power can be controllable and the switching loss therein also can be thus lowered.

Figure 1:
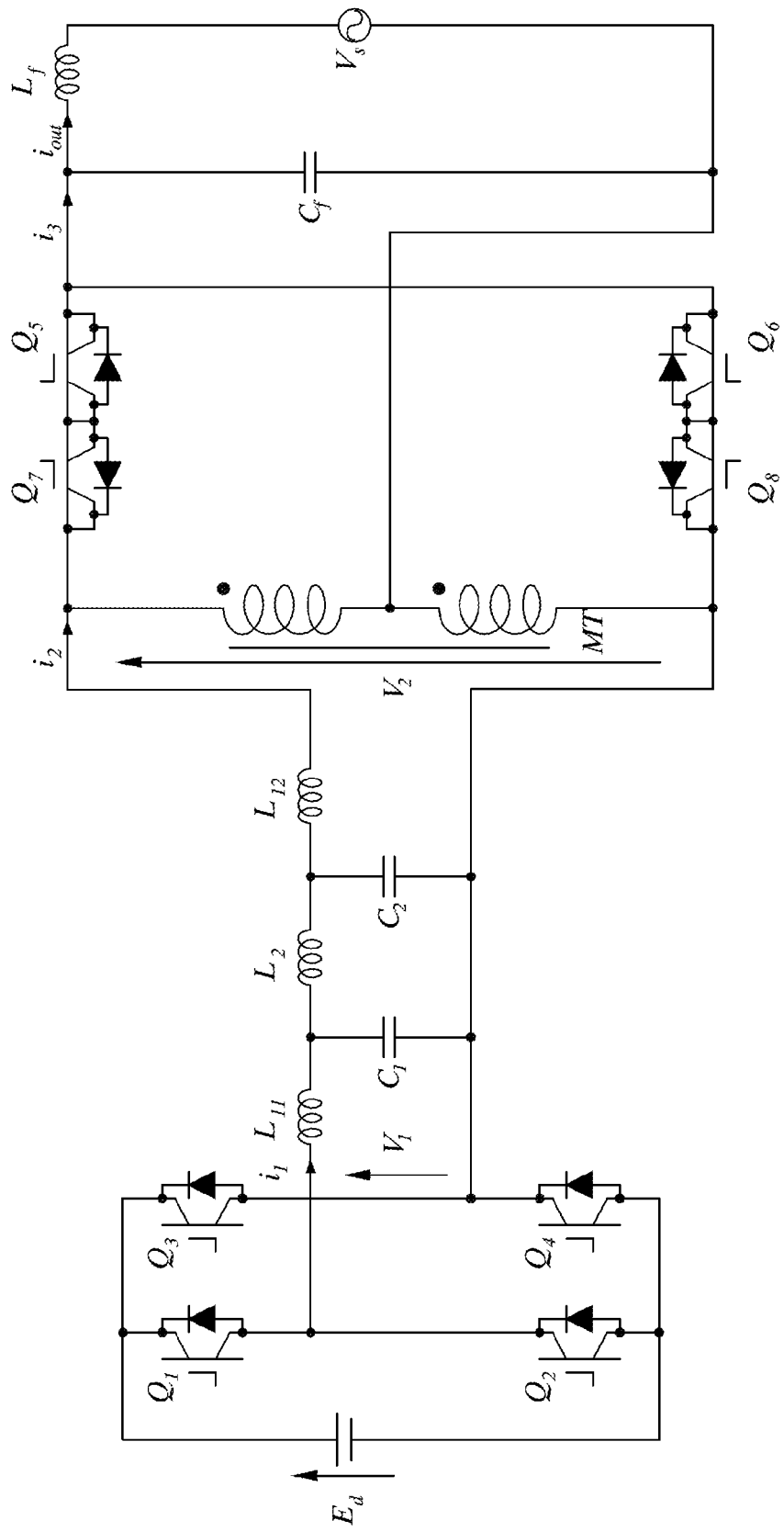
FIGS. 1 and 2 are circuit and block diagrams of a prior-art DC-to-AC power inverter for photovoltaic modules, respectively.
Figure 2:
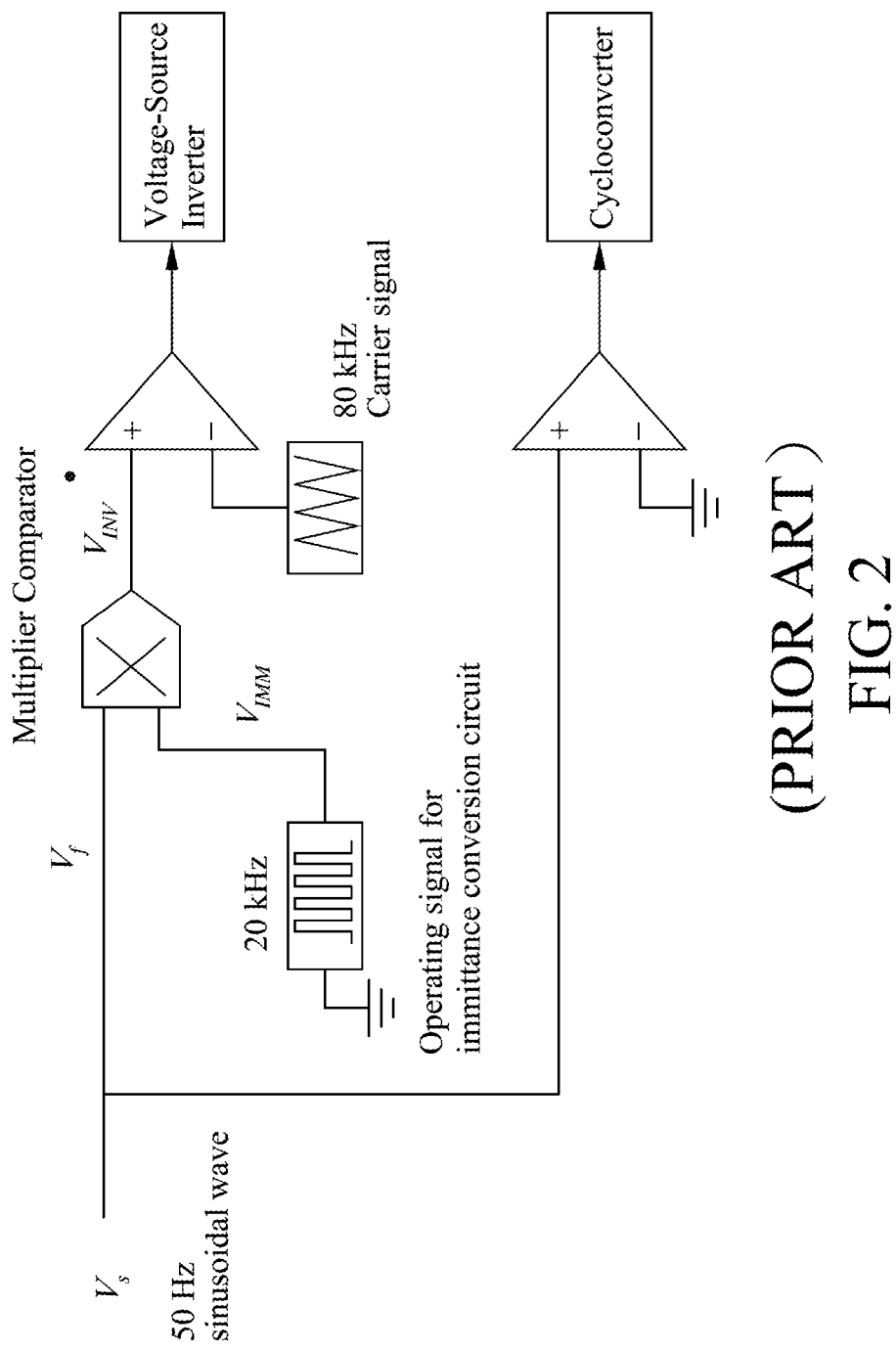
Figure 3:
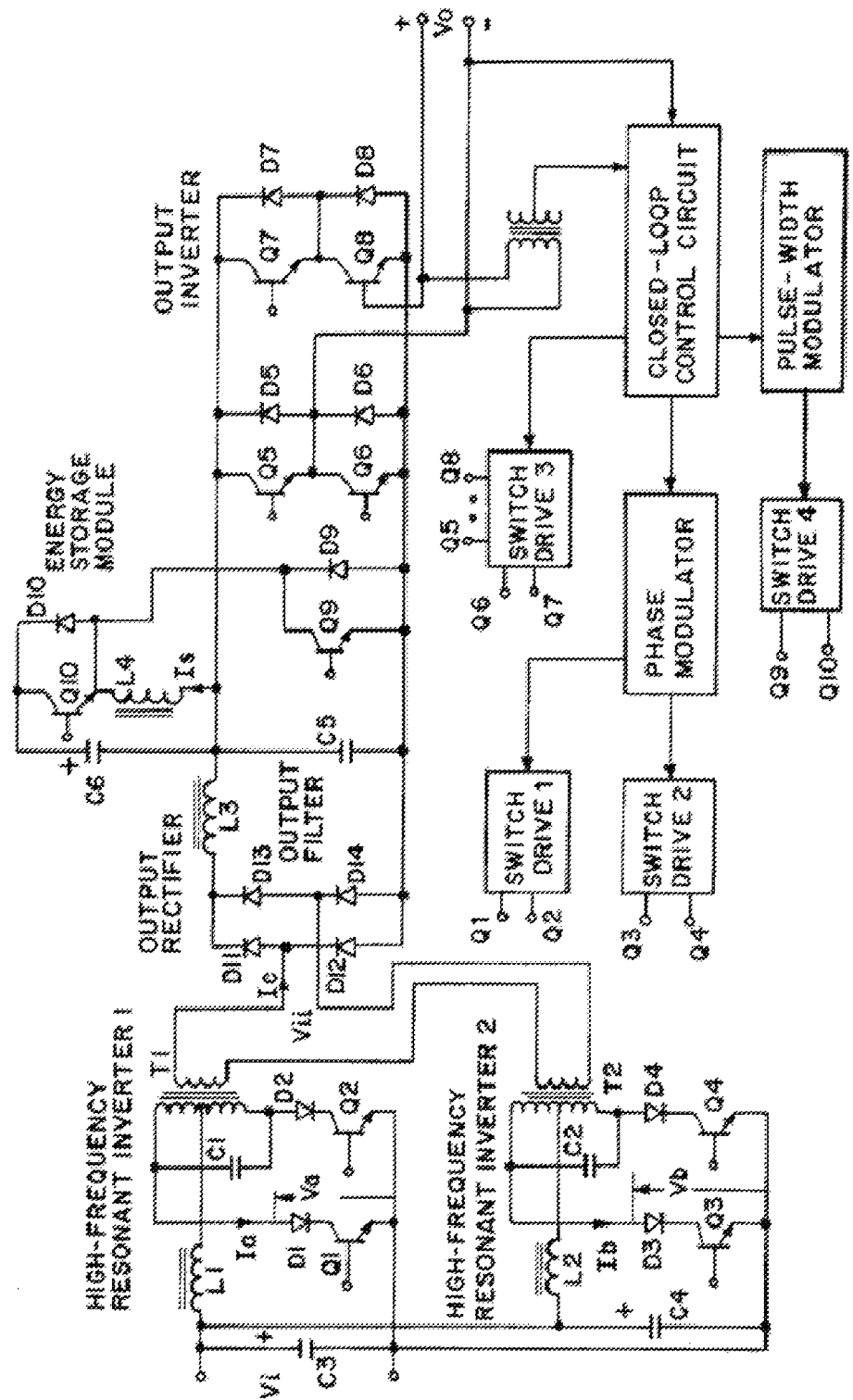
FIG. 3 is a circuit diagram of a prior-art DC-to-AC power inverting apparatus for photovoltaic modules according to the patent U.S. Pat. No. 4,641,232.
Figure 4:
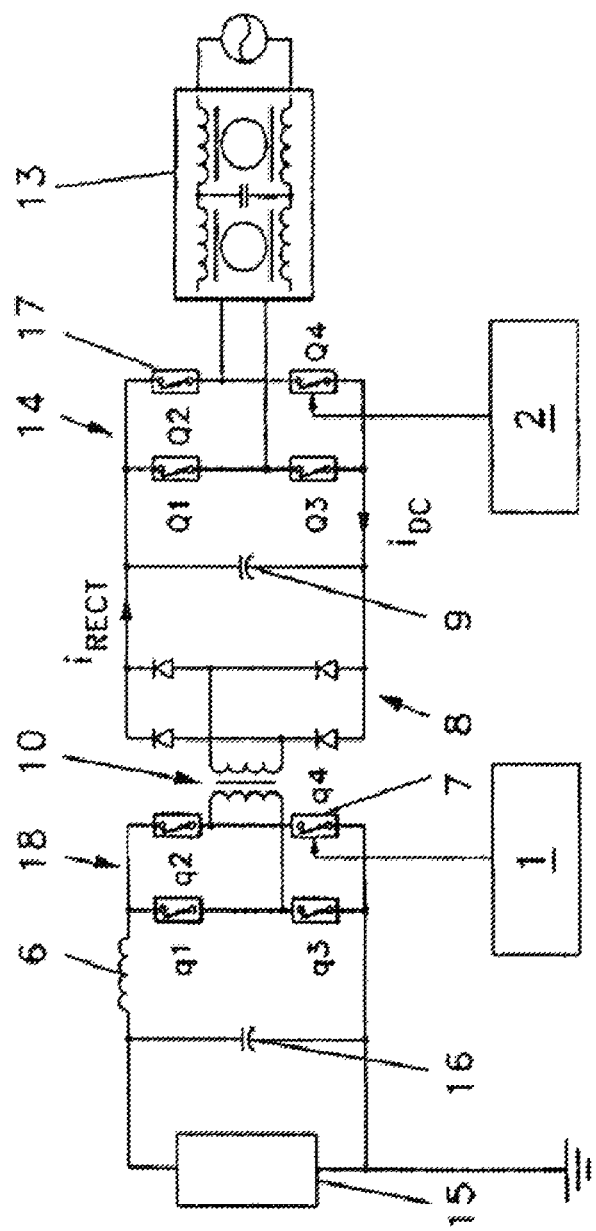
FIG. 4 is a circuit diagram of a prior-art DC-to-AC power inverting apparatus for photovoltaic modules according to the patent U.S. Pat. No. 7,339,287.
Figure 5:
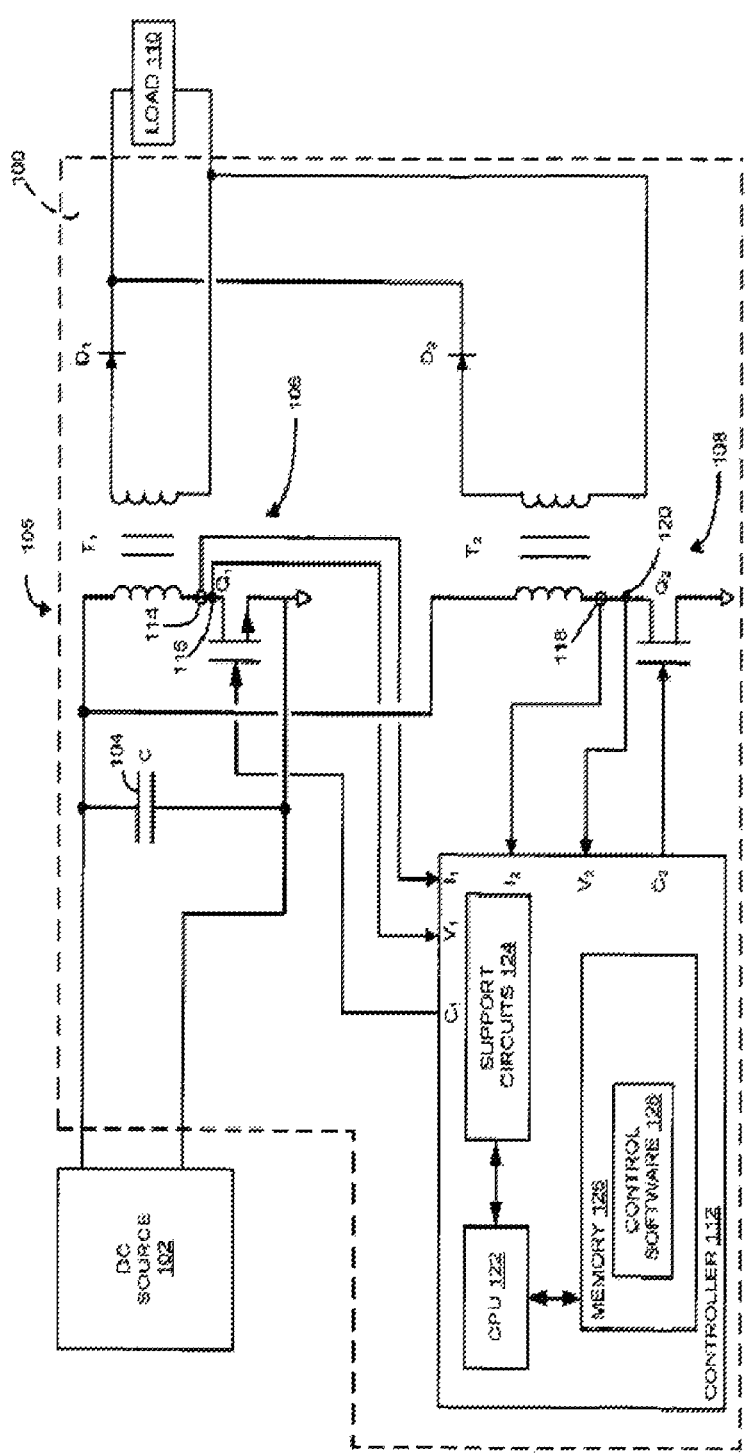
FIG. 5 is a circuit diagram of a prior-art DC-to-AC power inverting apparatus for photovoltaic modules according to the patent application US 20090086514.
Figure 6:
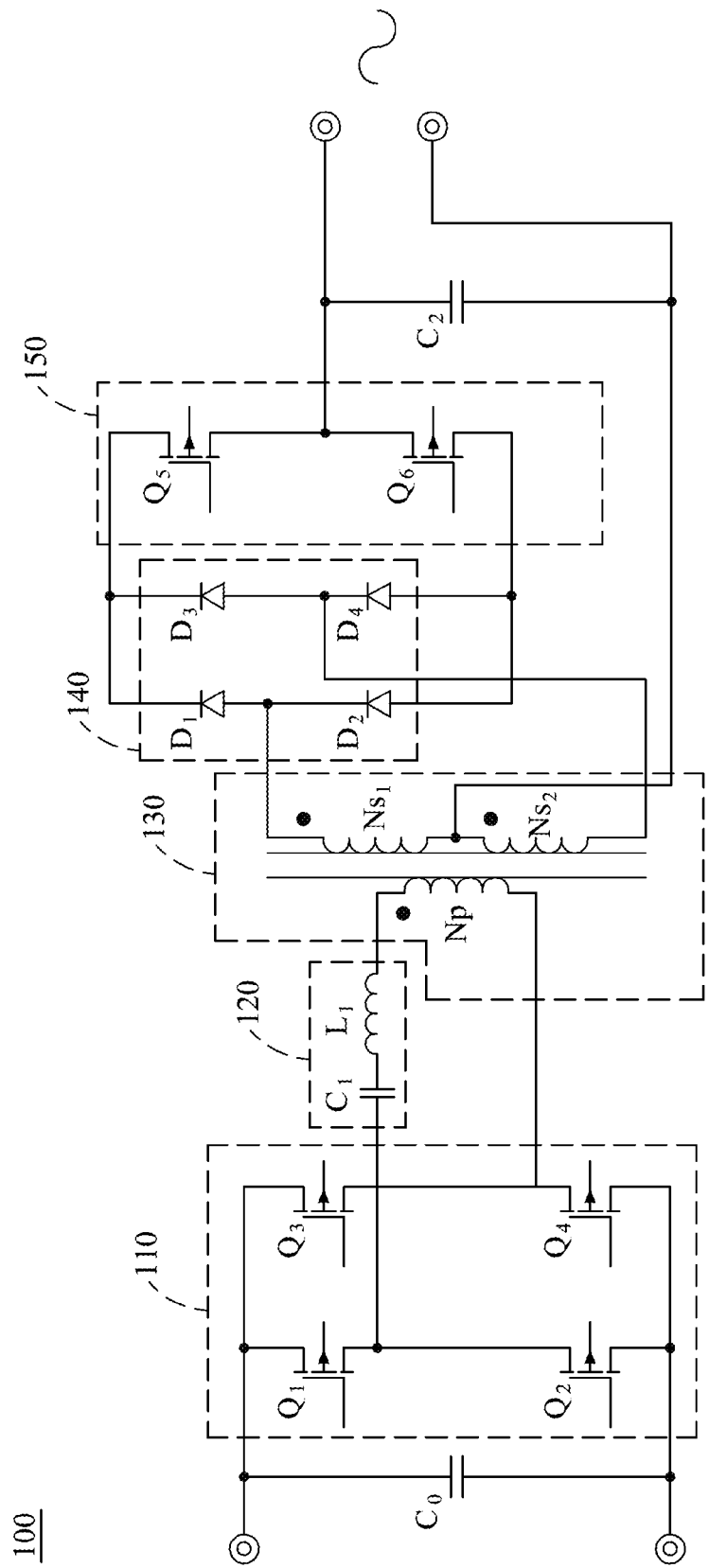
FIG. 6 is a circuit diagram of a DC-to-AC power inverting apparatus for photovoltaic modules according to a first embodiment of the present disclosure.

Please refer to FIG. 6, which is a circuit diagram of a DC-to-AC power inverting apparatus for photovoltaic modules according to a first embodiment of the present disclosure. In FIG. 6, the power inverting apparatus 100 comprises: a DC-to-AC converting unit 110, a resonating unit 120, an isolating transformer 130, a full-wave rectifying unit 140, and an inverter unit 150.

The DC-to-AC converting unit 110 composed of a full-bridge inverter, which includes four active switches: a first, a second, a third, and a fourth ones ($Q_1$, $Q_2$, $Q_3$, and $Q_4$), wherein the first and second active switches ($Q_1$ and $Q_2$) are connected at a first connection point, and the third and fourth active switches ($Q_3$ and $Q_4$) are connected at a second connection point. The first and third active switches ($Q_1$ and $Q_3$) are connected to one of two input terminals of the power inverting apparatus 100, while the second and fourth active switches ($Q_2$ and $Q_4$) are connected to the other input terminal. Across the input terminals, a capacitor $C_0$ is connected in parallel to the DC-to-AC converting unit 110. The DC-to-AC converting unit 110 functions as an inverter to regulate an input DC power into an AC power of constant AC voltage. In this embodiment, each of the first, second, third, and fourth active switches ($Q_1$, $Q_2$, $Q_3$, and $Q_4$) is composed of a transistor.

The resonating unit 120 is composed of a first inductor $L_1$ and a first capacitor $C_1$ which are connected in series. The resonating unit 120 is connected to the first connection point to receive the AC voltage from the DC-to-AC converting unit 110. The AC voltage is resonated by the resonating unit 120 and is then diminished its value of voltage to zero in several resonant cycles.

The isolating transformer 130 is composed of three windings: a first, a second, and a third ones with respective numbers of winding turns Np, $Ns_1$, and $Ns_2$. In this embodiment, the first winding is the primary winding, and the second and third windings are first and second secondary windings of the isolating transformer 130, respectively; wherein the ratio of the number of turns in the first secondary winding to the in the second secondary winding is 1:1. The two terminals of the primary winding are connected respectively to the resonating unit 120 and the second connection point of the DC-to-AC converting unit 110, and the first and second secondary windings of the isolating transformer 130 are connected at a third connection point. The isolating transformer 130 is used to transform the AC voltage received from the DC-to-AC converting unit 110 into AC voltages of another values.

The full-wave rectifying unit 140 includes four passive switches: a first, a second, a third, and a fourth ones ($D_1$, $D_2$, $D_3$, and $D_4$), wherein the first and second passive switches ($D_1$ and $D_2$) are connected at a fourth connection point, the third and fourth passive switches ($D_3$ and $D_4$) are connected at a fifth connection point, the first and third passive switches ($D_1$ and $D_3$) are connected at a sixth connection point, the second and fourth passive switches ($D_2$ and $D_4$) are connected at a seventh connection point, the fourth connection point connected to the first secondary winding, and the fifth connection point connected to the second secondary winding of the isolating transformer 130. The full-wave rectifying unit 140 functions to convert an AC power to a DC power. In this embodiment, each of the first, second, third, and fourth passive switches ($D_1$, $D_2$, $D_3$, and $D_4$) is composed of a diode.

The inverter unit 150 is composed of two active switches: a fifth and a sixth ones ($Q_5$ and $Q_6$), which are connected to one of two output terminals of the power inverting apparatus 100. The sixth connection point of the full-wave rectifying unit 140 is connected to the fifth active switch $Q_5$, and the seventh connection point is connected to the sixth active switch $Q_6$. On the other hand, the third connection point of the isolating transformer 130 is connected to the other output terminal. Further, a second capacitor $C_2$ is disposed cross the output terminals.

Figure 7A:
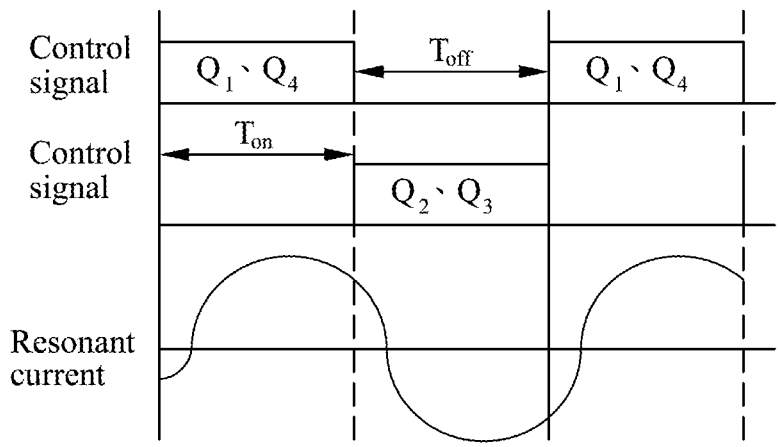
FIGS. 7A-C are control signals of switching in a prior-art full-bridge inverter and the proposed full-bridge inverter in the first embodiment

FIG. 7A illustrates control signals of switching in a prior-art full-bridge inverter combined with a resonant circuit in series. In this case, both the turn-on and turn-off time intervals ($T_{on}$ and $T_{off}$) of its four active switches are 50% of a switching period, and the magnitude of its output power is controlled by the switching period. Two of the four active switches ($Q_1$, $Q_2$, $Q_3$, and $Q_4$) are responsible for the rectification of the positive control signal or gate signal, while the other two switches are responsible for the rectification of the negative control signal or gate signal. However, when the switching period does not match the resonant frequency of the resonant circuit, the current of the active switches operating in the cut-off condition may not vanish completely and, thus, may lead to non-negligible switching loss.

Figure 7B:
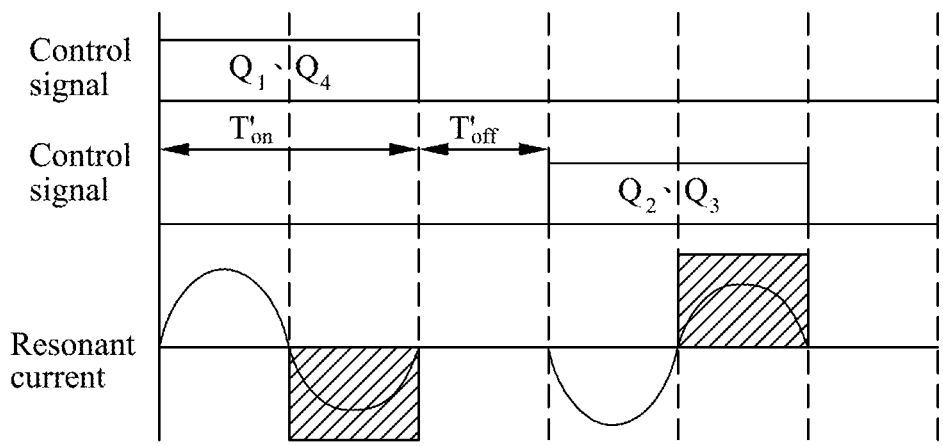
Figure 7C:
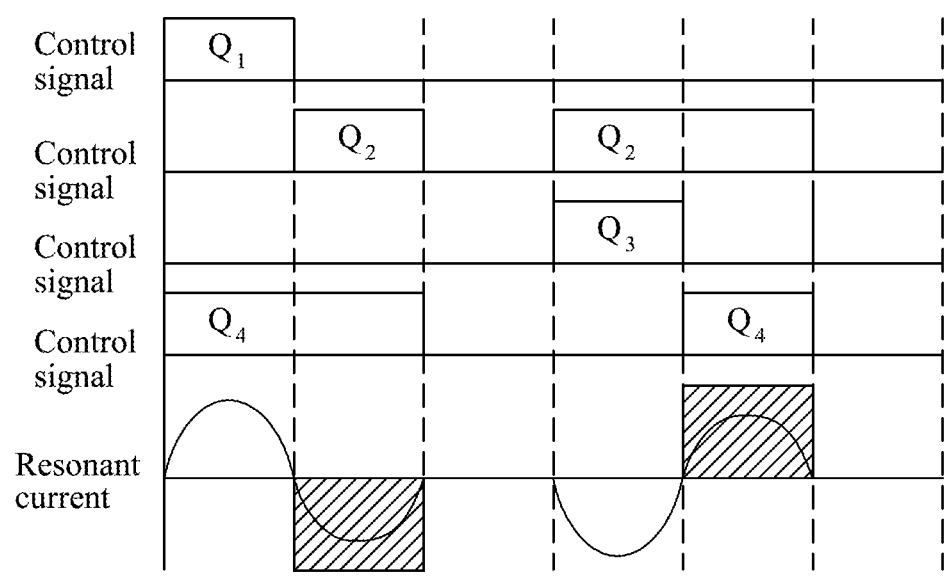

On the other hand, control signals of switching in the full-bridge inverter according to the present embodiment are illustrated in FIGS. 7B and 7C. FIG. 7B shows that the turn-on time interval of $T'_{on}$ corresponds with the resonant frequency of the LC circuit in series. When the current flowing in the resonant circuit reaches zero, the switches are cutoff for a while, for example, a turn-off time interval of $T'_{off}$. Proper control of $T'_{off}$ can further decrease switching loss of the active switches in the cut-off condition. However, in the shadow area of the resonant current in FIG. 7B, when the switches are turned on, a part of the regeneration current in the inverter flows backwards to the input terminals thereof due to the basic properties of a resonant circuit. Thus, the average current at input terminals goes up and then the turning-on loss of the switches is increased accordingly. Consequently, the strategy of controlling the active switches is modified in the embodiment as shown in FIG. 7C, where the switches $Q_1$ and $Q_4$ are turned on at the same time to induce the resonance of current. Under the condition of a regeneration region, as shadowed in FIG. 7C, the switch $Q_1$ is turned off and $Q_2$ is turned on; thus, the resonant current acts as a short-circuited one, and the peak current occurred in the turn-on time interval of $Q_1$ and $Q_4$ is reduced. The turning-on losses of the switches are then diminished accordingly.

Figure 8:
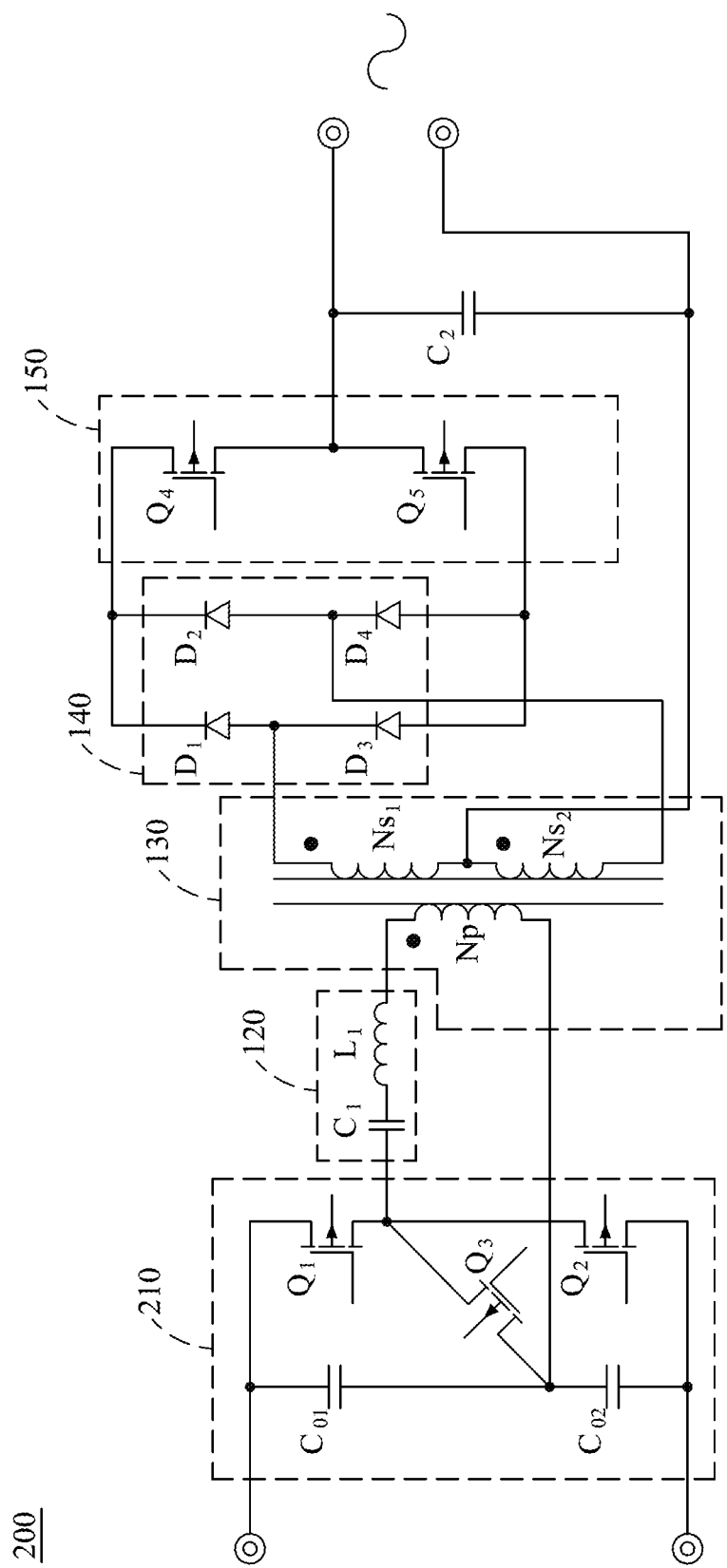
FIG. 8 is a circuit diagram of a DC-to-AC power inverting apparatus for photovoltaic modules according to a second embodiment.

There may be another embodiment according to the present disclosure. Please refer to FIG. 8, which is a circuit diagram of a DC-to-AC power inverting apparatus for photovoltaic modules according to a second embodiment. In FIG. 8, the power inverting apparatus 200 comprises: a DC-to-AC converting unit 210, a resonating unit 120, an isolating transformer 130, a full-wave rectifying unit 140, and an inverter unit 150. Generally, the circuits in the first and second embodiments are identical except the DC-to-AC converting unit 210. The DC-to-AC converting unit 210 composed of a half-bridge inverter, which includes three active switches: a first, a second, and a third ones ($Q_1$, $Q_2$, and $Q_3$), and a first and a second input capacitors ($C_{01}$ and $C_{02}$), wherein the first, second, and third active switches ($Q_1$, $Q_2$, and $Q_3$) are connected at a first connection point, the first and second input capacitors and the third active switch ($C_{01}$, $C_{02}$, and $Q_3$ are connected at a second connection point. The first active switch $Q_1$ and the first input capacitor $C_{01}$ are connected to one of two input terminals of the power inverting apparatus 200, while the second active switch $Q_2$ and the second input capacitor $C_{02}$ are connected to the other input terminal. The DC-to-AC converting unit 210 functions as an inverter to regulate an input DC power into an AC power of constant AC voltage. The resonating unit 120 is connected to the first connection point to receive the AC voltage from the DC-to-AC converting unit 210, while the second connection point of the DC-to-AC converting unit 210 is connected to one of the two terminals of the primary winding in the isolating transformer 130. The related information of the resonating unit 120, isolating transformer 130, full-wave rectifying unit 140, and inverter unit 150 can be referred to the foregoing descriptions of the first embodiment.

Figure 9A:
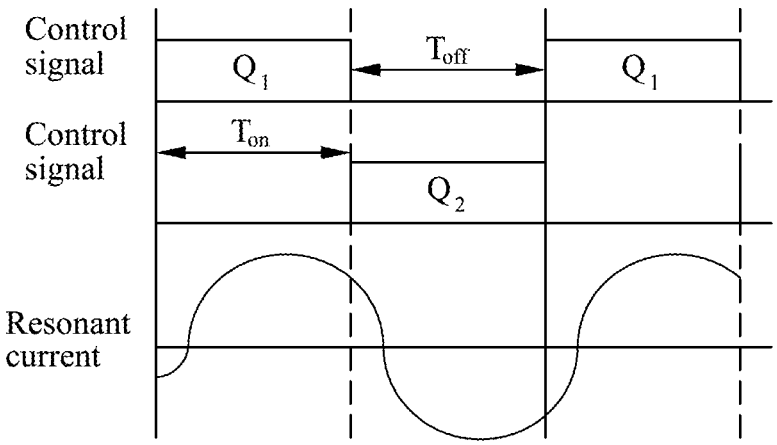
FIGS. 9A-C are control signals of switching in a prior-art half-bridge inverter and the proposed half-bridge inverter in the second embodiment
Figure 9B:
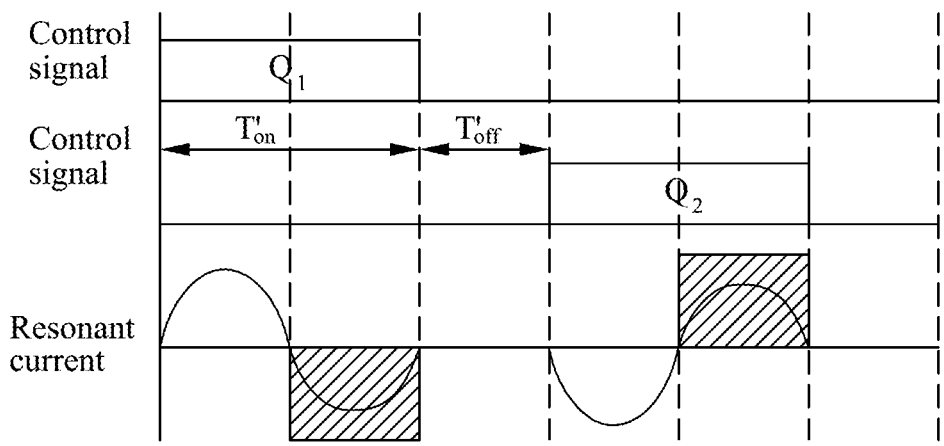
Figure 9C:
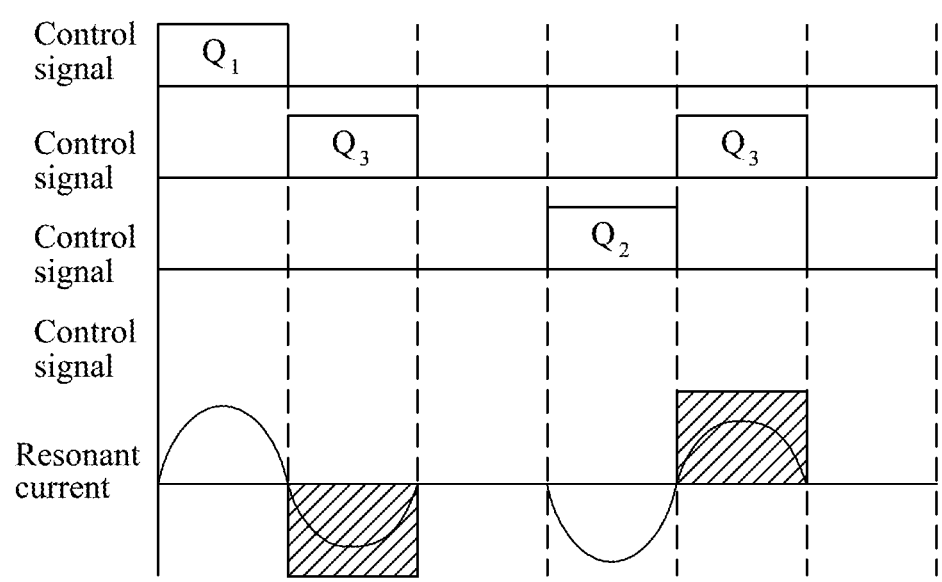

FIGS. 9A-C illustrate control signals of switching in a prior-art half-bridge inverter and the proposed half-bridge inverter in this embodiment, corresponding to three cases in FIGS. 7A-C, respectively. However in this embodiment, the switches $Q_1$ is responsible for the rectification of the positive control signal or gate signal, while the switch $Q_2$ is responsible for the rectification of the negative control signal. When $Q_3$ is turned on at that time to induce the resonance of current, the operational condition can be in a regeneration region as shadowed in FIG. 9C, where the switch $Q_1$ is turned off and $Q_2$ is turned on, Thus, the resonant current acts as a short-circuited one, and the peak current occurred in the turn-on time interval of $Q_3$ is reduced. The turning-on losses of the switches are then diminished accordingly.

Conventionally, the need of a low-frequency transformer to operate an AC output of a full-bridge inverter for a solar or photovoltaic module in parallel with the public electrical supply may cause a drawback of large volume. Here in this present disclosure, a DC-to-AC power inverting apparatus for photovoltaic modules is provided to decrease the volume of the transformer due to the new circuit configuration and controlling means. The full-wave rectification at the secondary winding of the transformer to rectify AC power to DC power, and the low-frequency switching operation of the inverter unit can lower the switching loss in the switches and hence improve the conversion efficiency of the DC-to-AC power inverting apparatus. On the other respect, regarding the controlling mechanism of the switchers in the full-bridge, the turn-on time interval is fixed and the control signal is turned off after the resonant current reaches zero to avoid switching loss when the switches are turned off. The resonant frequency of the LC circuit in series may range from tens to hundreds of KHz, so that the switching frequency is less than the resonant frequency. Furthermore, the AC output current of the apparatus can be controlled by a designated turn-off time interval for the switches. For the transformer, its high-frequency switching mode may lead to advantages of volume and its isolating mode also may result in advantages of cost and volume over the conventional low-frequency transformer. Besides, the full-wave rectifier and the two active switcher connected to the secondary winding of the transformer are switched in synchrony to the frequency of the public electrical supply.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A DC-to-AC power inverting apparatus for photovoltaic modules, the power inverting apparatus comprising:
   a DC-to-AC converting unit composed of a half-bridge inverter, which comprises a first, a second, and a third active switches, and a first and a second capacitors, the first, second, and third active switches connected at a first connection point, the first and second capacitors and the third active switch connected at a second connection point;
   a resonating unit comprising a first inductor and a third capacitor which are connected in series, the resonating unit connected to the first connection point;

an isolating transformer comprising a first, a second, and a third windings, the two terminals of the first winding connected respectively to the resonating unit and the second connection point, and the second and third windings connected at a third connection point;

a full-wave rectifying unit comprising a first, a second, a third, and a fourth passive switches, the first and second passive switches connected at a fourth connection point, the third and fourth passive switches connected at a fifth connection point, the first and third passive switches connected at a sixth connection point, the second and fourth passive switches connected at a seventh connection point, the fourth connection point connected to the second winding, and the fifth connection point connected to the third winding; and an inverter unit comprising a fourth and a fifth active switches and a fourth capacitor, the fourth and fifth active switches connected at an eighth connection point, the sixth connection point connected to the fourth active switch, the seventh connection point connected to the fifth active switch, and the third and eighth connection points connected respectively to the fourth capacitor.

2. The power inverting apparatus of claim 1, wherein each of the first, second, third, and fourth active switches is composed of a transistor.

3. The power inverting apparatus of claim 1, wherein the first winding is primary winding of the isolating transformer, and the second and third windings are first and second secondary windings of the isolating transformer, respectively.

4. The power inverting apparatus of claim 3, wherein the ratio of the number of turns in the first secondary winding to the number of turns in the second secondary winding is 1:1.

5. The power inverting apparatus of claim 1, wherein each of the first, second, third, and fourth passive switches is composed of a diode.

* * * * *